United States Patent [19]

Bohman

[11] 4,093,089

[45] June 6, 1978

[54] ARRANGEMENT PARTICULARLY IN GOODS VEHICLE FOR CONVEYANCE OF LOAD CARRIERS POSITIONED IN DOUBLE OR MULTIPLE ROWS

[75] Inventor: Göte Hubert Bohman, Hudiksvall, Sweden

[73] Assignee: B.V. Foco Nederland, Meppel, Netherlands

[21] Appl. No.: 805,892

[22] Filed: Jun. 13, 1977

Related U.S. Application Data

[63] Continuation of Ser. No. 609,519, Sep. 2, 1975, abandoned.

[30] Foreign Application Priority Data

Sep. 3, 1974 Sweden .............................. 7411111

[51] Int. Cl.² .............................................. B60P 1/38
[52] U.S. Cl. ................................. 214/516; 214/518; 198/733; 214/83.36
[58] Field of Search ................. 214/83.36, 518, 75 T, 214/516, 77 P; 198/181, 728, 733, 425, 844, 850

[56] References Cited

U.S. PATENT DOCUMENTS

| 3,107,775 | 1/1977 | Dardaine et al. ............... 198/425 |
| 3,559,831 | 2/1971 | Weston ............................. 214/518 |
| 3,749,268 | 7/1973 | Macomber et al. ........... 214/518 X |
| 3,877,596 | 4/1975 | Bohman ............................. 214/518 |

*Primary Examiner*—Albert J. Makay
*Attorney, Agent, or Firm*—Newton, Hopkins & Ormsby

[57] ABSTRACT

An arrangement in a conveyor mechanism, particularly of the kind mounted on the loading platform of goods vehicles and comprising a continuous conveyor means on which are provided equidistantly spaced driving carriages to which are to be coupled one or several, usually two load-carrier means, e.g. in the form of transport containers. Each driving carriage has an outwardly projecting driving arm with coupling members thereon intended for engagement with means provided on the load-carriers.

4 Claims, 16 Drawing Figures

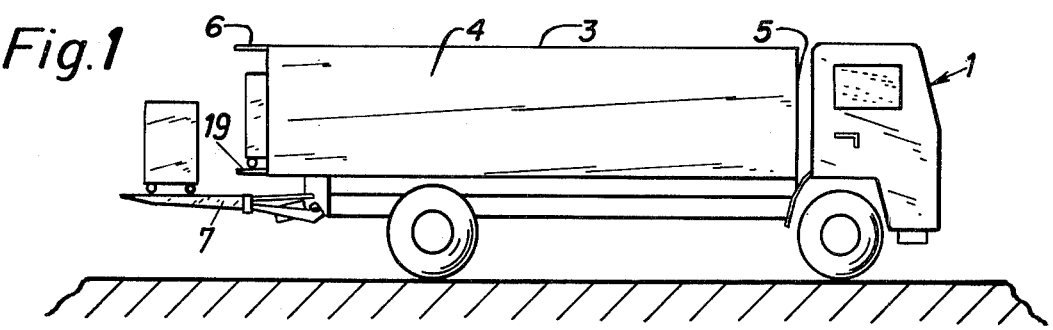
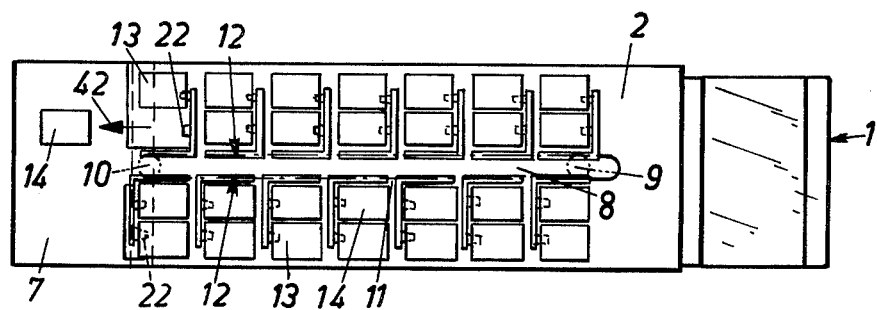
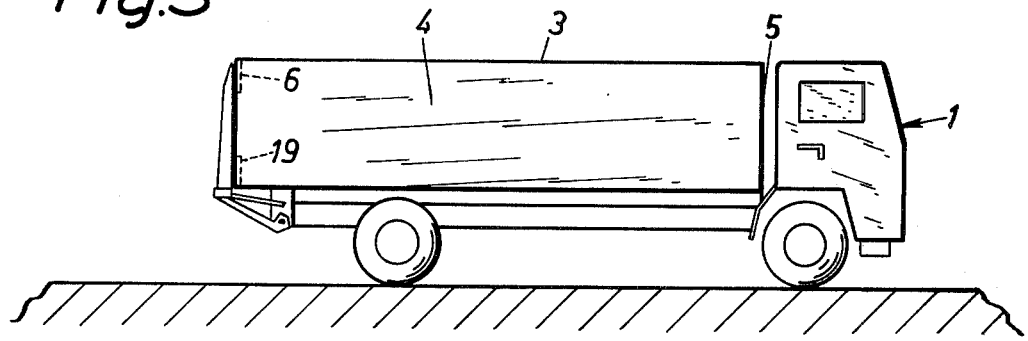
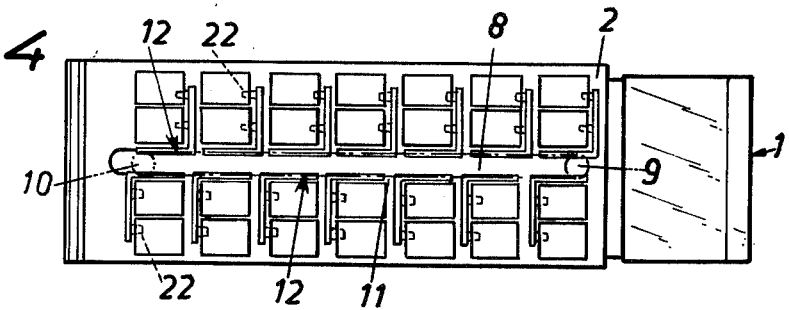

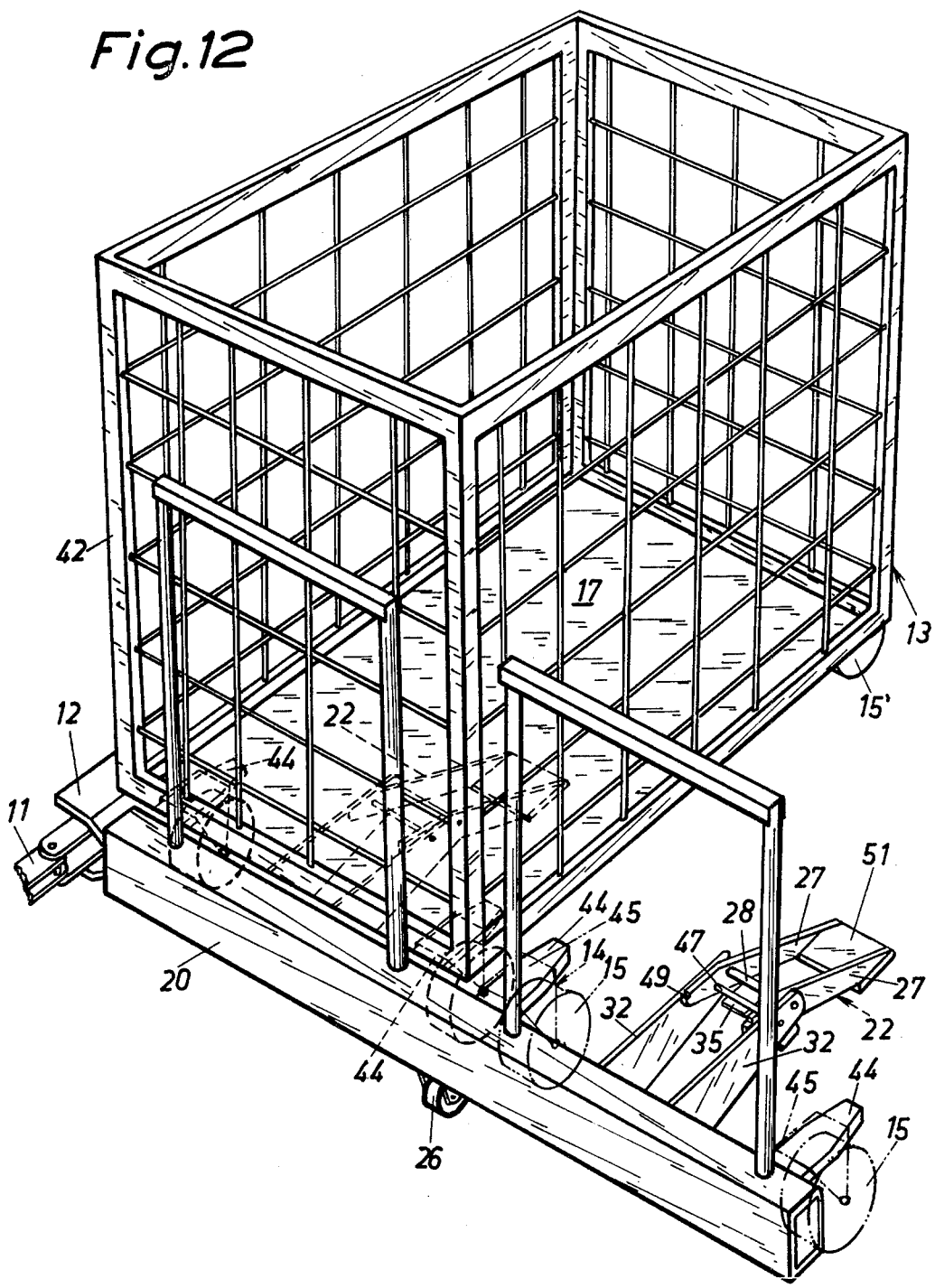

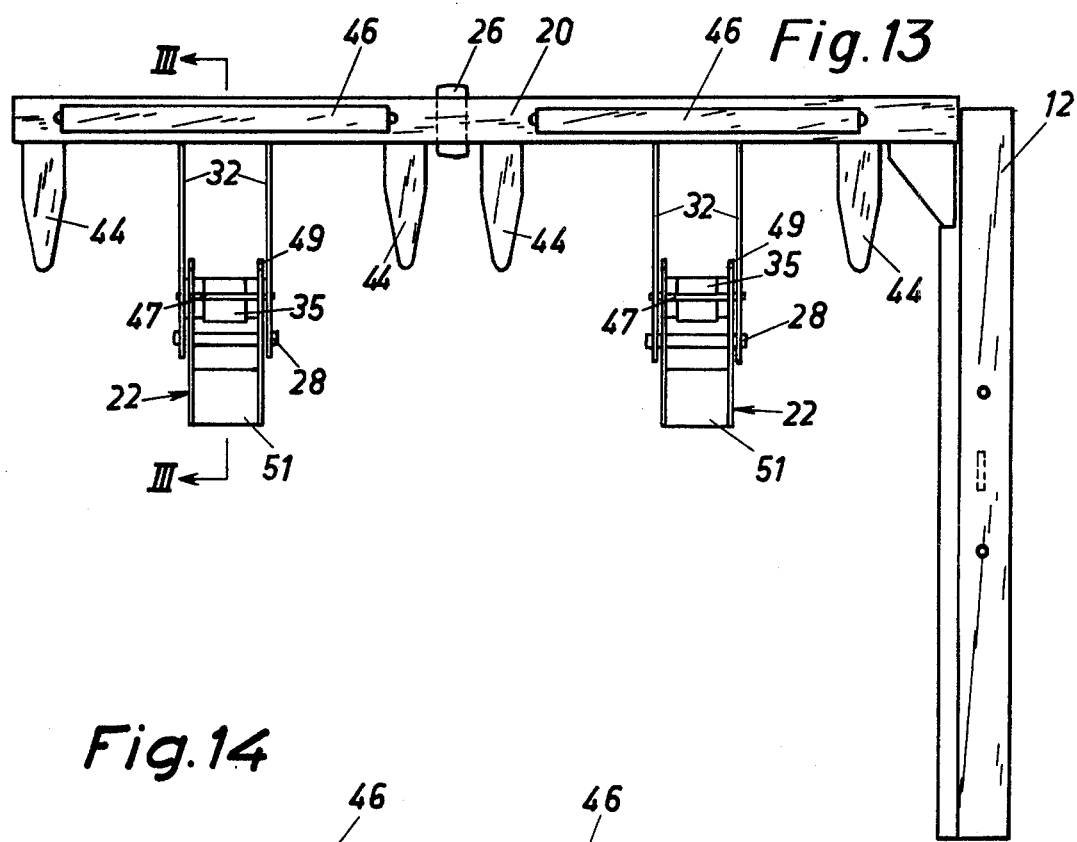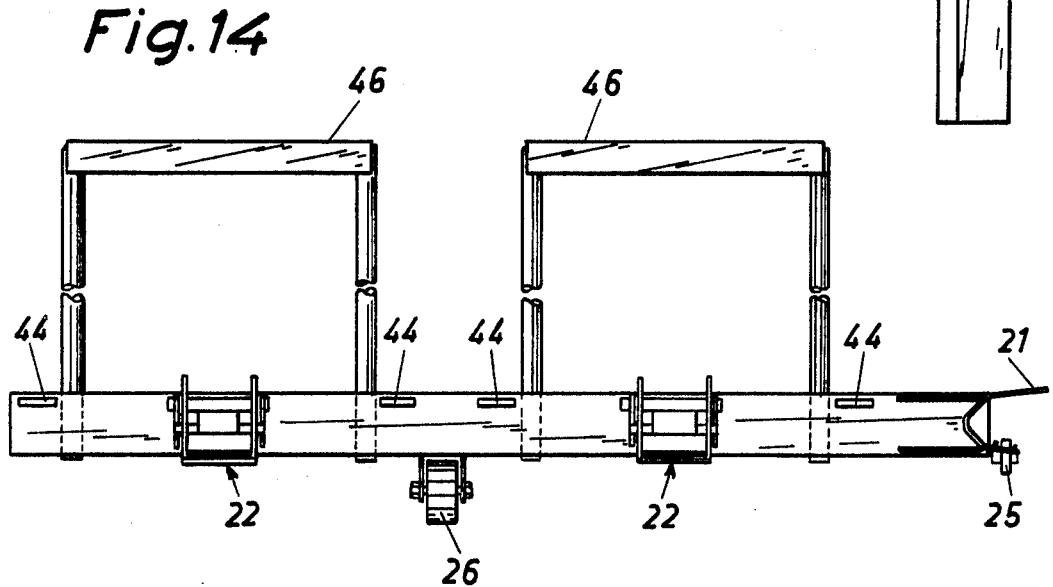

ARRANGEMENT PARTICULARLY IN GOODS VEHICLE FOR CONVEYANCE OF LOAD CARRIERS POSITIONED IN DOUBLE OR MULTIPLE ROWS

This application is a continuation of my prior application Ser. No. 609,519, filed Sept. 2, 1975, now abandoned, for an Arrangement Particularly in Goods Vehicles for Conveyance of Load Carriers Positioned in Double of Multiple Rows, now abandoned.

BACKGROUND OF THE INVENTION

The present invention refers to goods vehicles of the kind having a loading platform with a superstructure thereon, on which platform is provided a continuous conveyor means, preferably in the form of a chain running over two pulleys, one positioned at the rear end of the platform and the other one at the front end thereof. The conveyor means is provided with equidistantly spaced driving carriages to each one of which is to be coupled one or several, usually two load-carrier means. The latter generally are in the form of oblong transport containers provided with runner wheels at all four corners. At its rear the goods vehicle is provided with a preferably vertically movable deck which conveniently serves as a flap closing the rear opening of the superstructure and which may be moved to a position wherein it is essentially level with the platform surface.

In accordance with prior arrangements of goods vehicles of this kind the load-carrier means were coupled to the driving carriages at right angles to the chain, and consequently, when displaced on the platform by means of the chain, the load-carrier means were forced to run at right angles to their normal direction of displacement, i.e. transversely to their longitudinal extension. This restricts to one the number of rows of load-carrier means to be displaced on either side of the conveyor chain support beam, and as a result the existing volume of the superstructure was made use of to an unsatisfactorily low extent when small (short) load-carrier means were handled.

SUMMARY OF THE INVENTION

The present invention has for its purpose to remedy this drawback.

It is characteristic of the invention that each driving carriage is provided with an outwardly projecting driving arm on which are arranged a number of members positioned at various distances away from the carriage and each one capable of coupling a load-carrier means to the associated driving carriage. Owing to this arrangement it becomes possible to displace several, normally two load-carrier means on either side of the support beam in the normal direction of conveyance (the longitudinal direction) of the load-carrier means. It is thus possible to use the superstructure space more rationally and efficiently.

It is known to make the beam supporting the conveyor chain displaceable in the longitudinal direction of the vehicle in order that the vehicle length be kept as short as possible. Also the arrangement of the driving carriages outlined above makes possible to utilize a support beam which is movable in the longitudinal direction of the vehicle, provided that at the rear end of the platform are positioned two foldable flaps, one on either side of the support beam and arranged, when in their downwards folded position and when the platform assumes a lower position, to support the rear portion of those load-carrier means which at that moment are positioned at the far rear end of the platform. These flaps are preferably arranged to be folded downwards automatically from a vertically upright position to a horizontal position when the support beam moves rearwards, and to be raised to their original upright position when the support beam moves forwards.

BRIEF DESCRIPTION OF THE DRAWINGS

Further characteristics of the invention will become apparent upon reading of the following detailed description with reference to the accompanying drawings wherein FIG. 1 is a side view of a goods vehicle in accordance with the invention, FIG. 2 is a plan view of said vehicle with the superstructure imagined removed and illustrating the release or disconnection of a load-carrier means, FIG. 3 is a side view of the transport vehicle in position of transport, FIG. 4 is a view corresponding to FIG. 2 but illustrating the support beam in its forward position, FIG. 12 shows in a perspective view a driving means arm in accordance with a somewhat modified embodiment and a load-carrier means coupled thereto, FIG. 13 shows the driving arm in accordance with FIG. 12 as seen in a view from the side, FIG. 14 shows the same device as in FIG. 13 but in a view from above.

DETAILED DESCRIPTION OF PREFERRED EMBODIMENTS

Figure 9:
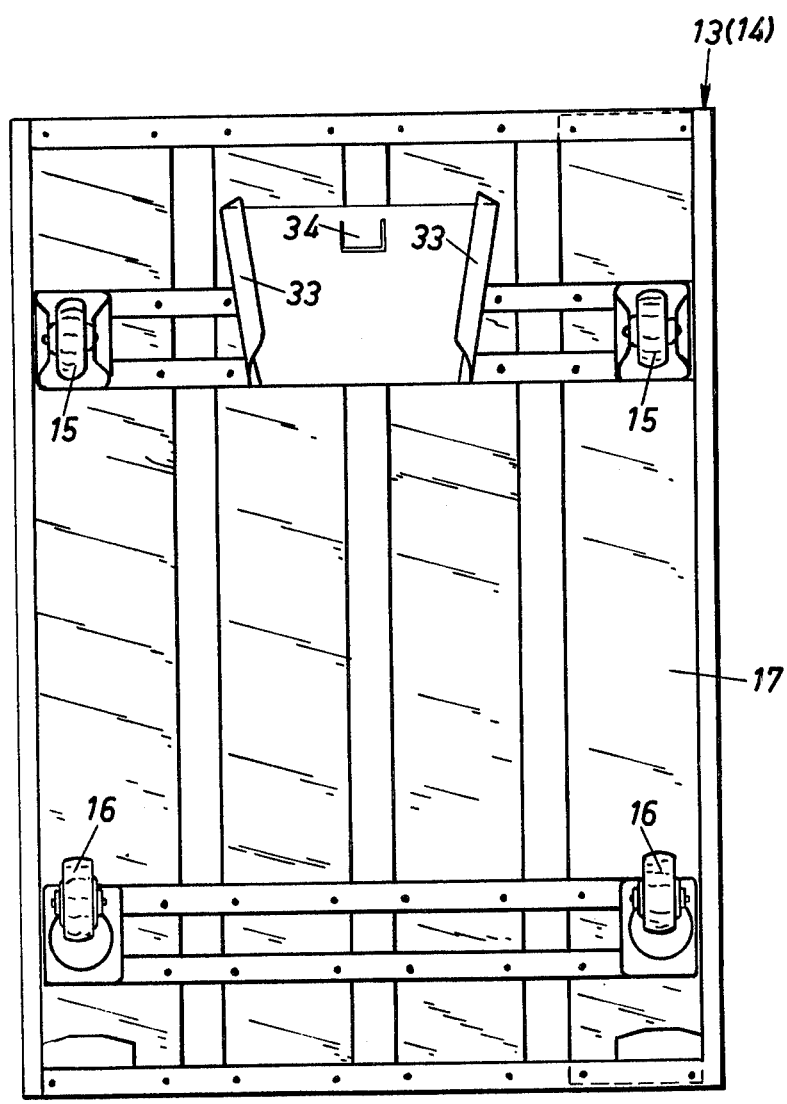
FIG. 9 illustrates on a reduced scale the lower face of a load-carrier means in the shape of a transport container provided with wheels.

In FIGS. 1 – 4 is illustrated a goods vehicle 1 comprising a loading platform 2 on which is provided a superstructure 3 consisting of two side walls 4, a front wall 5 and two flaps 6, 7, the latter, flap 7, being not only foldable between a vertical and a horizontal position but also arranged to be raised and lowered. A support beam 8 is mounted for movement in the longitudinal direction of the loading platform 2, the ends of said beam supporting rotatably mounted chain wheels 9, 10 over which runs horizontally an endless conveyor chain 11. The latter is provided with equidistantly spaced driving carriages 12 adapted to drive load-carrier means 13, 14. As the load-carrier means is normally used a transport container (FIG. 9) which is supported on two pairs of runner wheels 15, 16 attached to the underside of the bottom 17 of the transport container.

The entire support beam 8 together with its associated chain wheels 9, 10 and a drive mechanism therefor (not shown) as well as the chain 11 running over the chain together with the driving carriages 12 may be displaced in the longitudinal direction of the loading platform 2 from a rear position (FIG. 2) in which the rear end of the beam 8 extends out onto or beyond the flap 7, to a forward position (FIG. 4) in which the conveyor mechanism is positioned entirely inside the superstructure 3. At the rear end of the loading platform 2 two flaps 19, one on either side of the support beam 8, are pivotably mounted about horizontal shafts 18. In accordance with the embodiment illustrated in FIG. 5, the flaps 19 may be folded manually but, as mentioned above, they may instead preferably be arranged in such a manner that from an upright position (FIG. 3) they are automatically pivoted to a horizontal position (FIGS. 1 and 2) when the support beam 8 is displaced in the rearwards direction and, upon displacement of the support beam in the forwards direction, the flaps are automatically pivoted upwards to their original position (FIG. 3).

Figure 5:
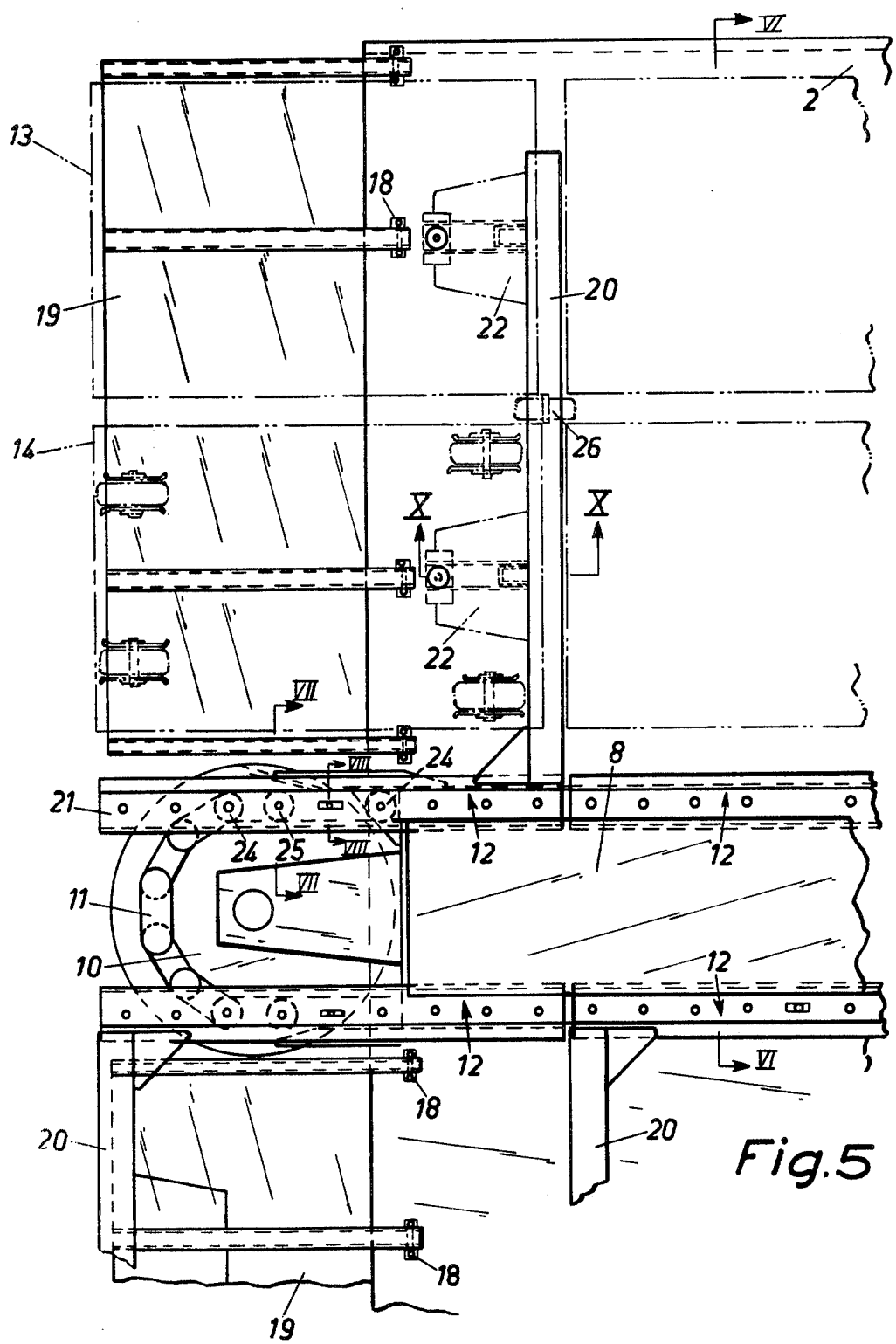
FIG. 5 shows on an enlarged scale a broken plan view of the rear portion of the goods vehicle in accordance with FIG. 2.
Figure 7:
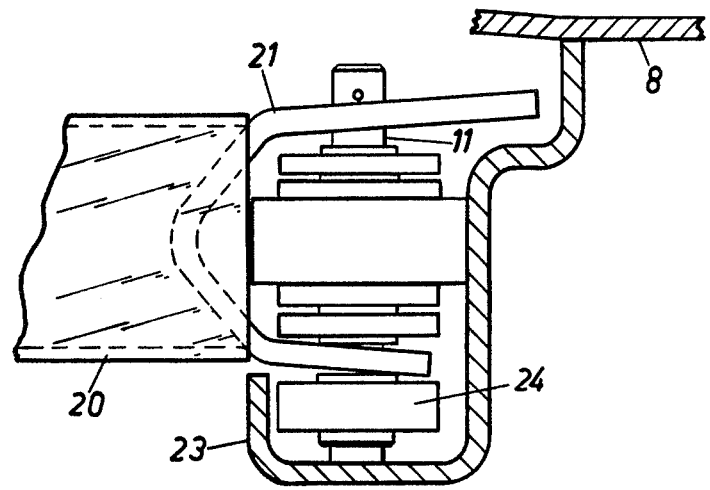
FIG. 7 illustrates on an enlarged scale a cross-sectional view along line VII—VII of FIG. 5 through the inner part of a driving carriage and guide therefor on the support beam.
Figure 8:
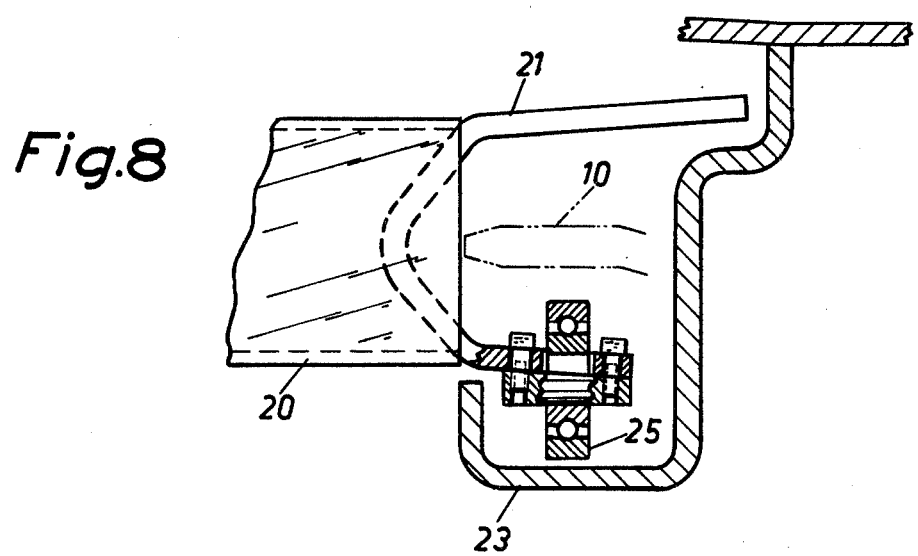
FIG. 8 shows a similar cross-sectional view but along line VIII—VIII in FIG. 5.

Each driving carriage 12 (FIG. 5) is provided with a horizontally extending driving arm 20 which in accordance with the embodiment shown is provided with two members 22 positioned at different distances away from the portion 21 of the driving carriage 12 secured to the conveyor chain 11, each one of said members 22 arranged to connect its associated transport container 13, 14 to the arm 20. The driving carriages are guided in a guide means 23 on the support beam 8 by means of two guide rollers 24 (FIGS. 5, 6 and 7) positioned on either side of a runner 25 (FIGS. 5 and 8). The runner 25 preferably consists of the outer race of a ball bearing. The driving arm 20 is supported in its horizontal position by a runner 26.

Figure 6:
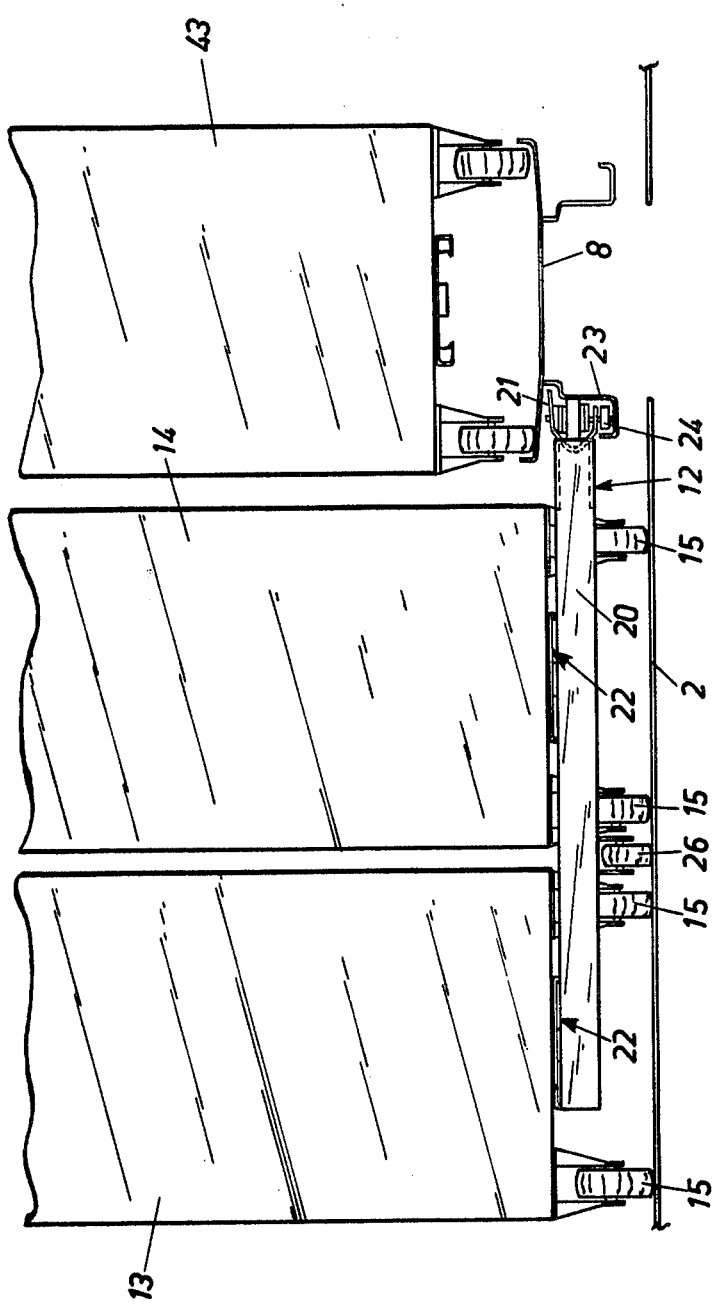
FIG. 6 is a cross-sectional view along line VI—VI of FIG. 5.
Figure 10:
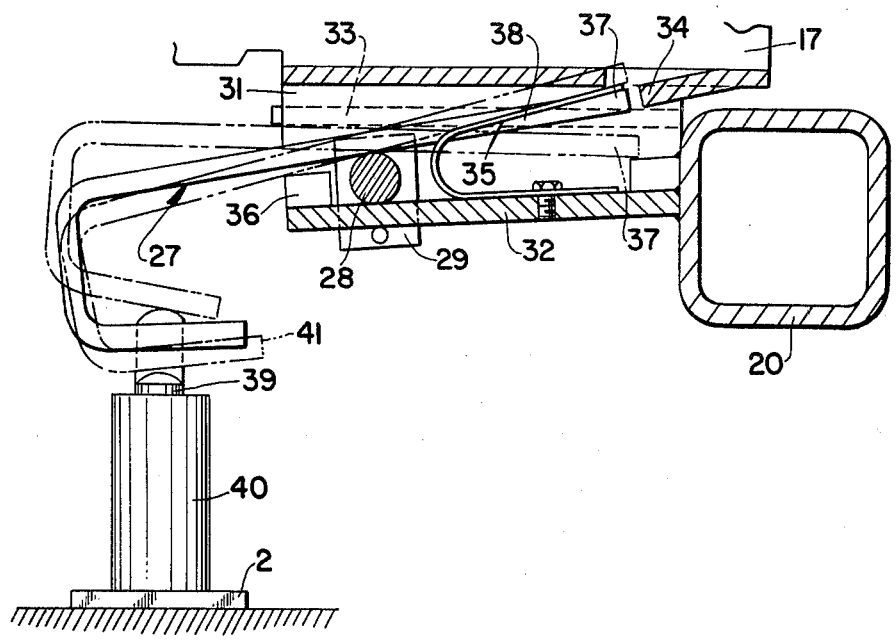
FIG. 10 shows on approximately the same scale as FIGS. 7 and 8 a cross-sectional view along line X—X through the driving means arm and its device for connecting a transport container to the arm.
Figure 11:
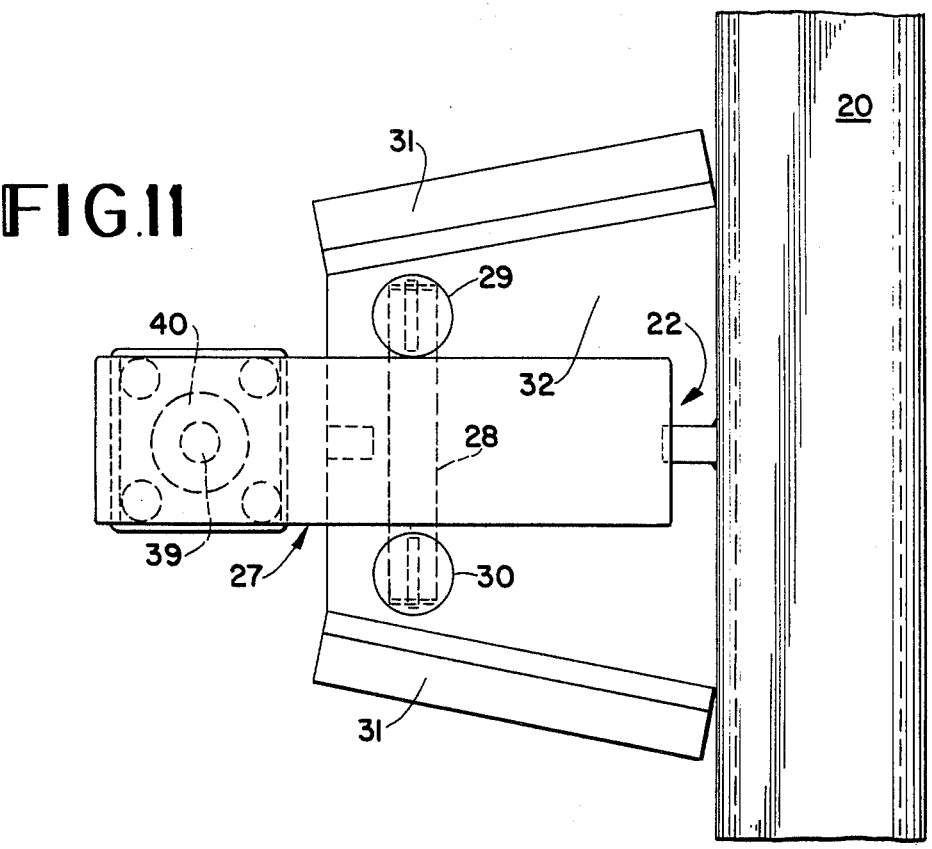
FIG. 11 is a plan view of the connecting device proper.

The connecting members provided on each driving arm 20 consist each one of a two-arm lever 27 (FIGS. 10 and 11) on which is provided a horizontal bolt 28 which is journalled in bearings 29, 30 provided on a support plate 32 positioned at one side of the driving arm 20 and provided with guide rails 31. The guide rails 31 converge in a direction away from the arm 20 and fit a pair of matching guide flanges 33 (FIG. 9) provided on a mounting plate including a catch shoulder 34 arranged on the underside of the bottom 17 of the transport container. The swinging movement of the lever 27 is effected by a spring means 35 in the counter-clockwise direction as seen in FIG. 6 so as to abut against a stop shoulder 36, in which position the free end 37 of one arm 38 of the lever is located in the path of movement of the catch shoulder 34 on the transport container 13, 14. A preferably hydraulically operated piston 39 in a vertical cylinder 40 is provided on the loading platform 2 and serves to press on the lever end 41 to swing the lever 27 in the clock-wise direction to a position in which the transport container is disconnected or released (indicated in dash-and-dot lines in FIG. 10, the arm ends 37 being in its lower position).

When a transport container, e.g. the rear container designated 14 in FIG. 2, is to be released and conveyed onto the horizontally raisable and lowerable flap 7 (see arrow 42 in FIG. 2), the lever 27 is swung in the clockwise direction by the piston 39, whereby the arm end 37 recedes from the catch shoulder 34. The transport container 14 is now released and after having been pulled out onto the flap 7 and following lowering of the latter, it is removed from the vehicle. Another transport container, e.g. an empty one, may thereafter be lifted on the flap 7 to a level flush with the loading platform 2 and then be displaced inwards against the driving arm 20 where, owing to the cooperation between the guide flanges 33 provided on the transport container and the guide rails 31 provided on the support plate 32, the transport container is guided into its correct position, the catch 34 swinging the lever 27 against the action of the spring 35 in the clockwise direction, whereupon the arm end 37 snaps in behind the catch 34. The transport container is now connected to its driving arm 20. By means of the conveyor chain 11 the entire number of transport containers 13, 14 may be displaced on the loading platform 2, it thus becoming possible to release or connect, according to wish, the desired number of transport containers at the rear end of the loading platform. Because the transport container, when displaced on the loading platform 2, runs in its normal direction of movement (longitudinal direction) the transport containers are allowed to be supported by all its four runner wheels 15, 16 also when one, 15, of the wheel pairs is fixedly mounted whereas the other wheel pair is pivotally mounted.

As indicated in FIG. 6 the support beam 8 may be designed so as to be able to accommodate a number of extra transport containers 43, e.g. empty containers being returned.

To interconnect the driving arm and the load carrier the embodiment illustrated in FIGS. 5 to 11 requires a special coupling plate mounted on the underside of the load-carrier. The load-carriers already in use in great numbers and not manufactured with such coupling plates thus must be supplemented with such plates before they can be coupled to the driving arm provided on the conveyor means in accordance with the embodiment described above.

In accordance with the embodiment illustrated in FIGS. 12 to 16 the interconnecting mechanism is modified in a manner permitting the driving arm to be connected directly to the load-carrier means proper without the assistance of special coupling plates provided on the load-carrier means.

In FIGS. 12 to 16 similar details with identical function as in FIGS. 1 to 11 are provided with the same numeral references.

On the driving arm 20 is mounted in accordance with FIG. 12 two load-carrier means 13, 14 (of load-carrier 14 are indicated only the fixed wheel bows). The load-carriers are provided with a crate 42 and beneath its bottom 17 are arranged in the conventional manner two pairs of runner wheels, of which the pair comprising the "fixed" wheels is designated 15 whereas the pivotally mounted pair of wheels is designated 15' (only one of the wheels of this pair mounted on load-carrier 13 is shown). The driving arm 20 which is arranged for movement together with the driving carriage 12 by means of the chain 11 is provided with a number of guide fingers 44, two of each load-carrier means 13 and 14. The guide fingers 44 are positioned opposite the associated one of the wheels of the fixed wheel pair 15 and are arranged upon interconnection between the load carrier means and the driving arm 20 to be inserted between the legs of the fixed wheel bows 45 of the load-carrier.

The driving arm 20 is provided with upright supports 46 positioned opposite the associate load-carrier. The supports 46 serve to prevent the load-carrier means from tilting and turning over backwards during its movement.

Figure 15:
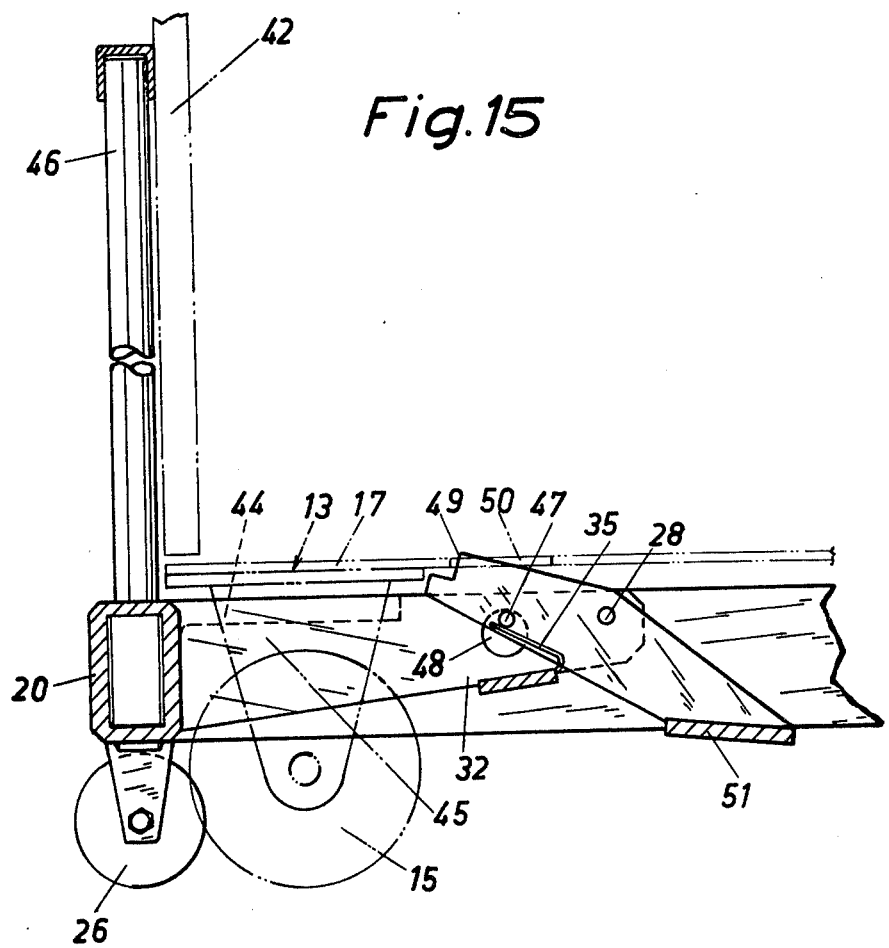
FIG. 15 illustrates on an enlarged scale a section along line XV—XV of FIG. 14.

The coupling member which as a unit is designated 22 in FIGS. 1 – 3 comprises two parallel, two-arm levers 27 which are mounted for pivotal movement about a horizontal shaft 28 which extends between two parallel legs 32 projecting from the driving arm. A horizontal rod 47 extends through the levers 27 and, as appears from FIG. 15, through apertures 48 formed in the legs 32. The diameter of the apertures 48 exceeds that of the rod 47 and the aperture edges are intended to limit the pivotal movement of the levers 27. A spring 35 is connected to the legs 32 and arranged to exert a pressure on the rod 47 in order to swing the levers 27 in the clockwise direction as seen in FIG. 15. The levers 27 are provided with an edge 49 at their one end, said edge arranged to engage in an aperture 50 or with a catch shoulder formed on the bottom 17 of a load-carrier means connected with the coupling member 22. In FIG. 15 the bottom 17 of the load-carrier 13 is indicated in dash-and-dot lines, and the edge 49 is shown in engagement with the aperture 50. At the opposite ends of the levers is arranged a lifting plate 51 which is fixed to and interconnects both levers 27. Upon application of a force from below, the levers 27 are swung in the counter-clockwise direction against the action of the spring 35, whereby the edge 49 is urged out of its locking engagement.

The load-carrier means thus are interconnected in the same manner as described in connection with FIGS. 1 to 12. Instead of the special coupling place attached to the underside of the load-carrier in accordance with the embodiment of FIGS. 5 to 12 the wheel bows 45 of the load-carriers are used for the coupling operation.

Figure 16:
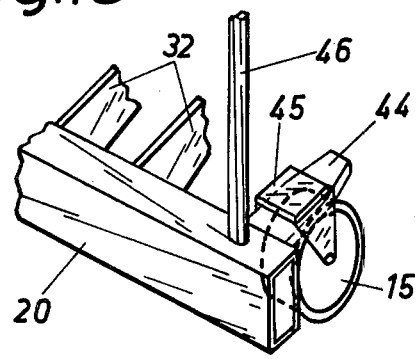
FIG. 16 illustrates in a perspective view a part of the driving arm in accordance with FIG. 12 and a load-carrier means connected thereto.

The detail view of FIG. 16 does not show the bottom 17 of the load-carrier means in order to illustrate clearly the manner in which the guide finger 44 is introduced into the bow 45 above the wheel 15. The guide fingers taper towards their free ends in order to facilitate their introduction into the wheel bows 45.

Upon interconnection of a load-carrier means 13, 14 and the driving arm 20 the load-carrier end provided with the pair of "fixed" wheels 15 is pushed towards the driving arm, whereby the guide fingers 44 are inserted between the extremities of the bows of each wheel of the wheel pair 15, and the edge 49 formed on the coupling member levers 27 is snapped into engagement with the catch shoulder or the aperture 50 formed on the bottom 17. The load-carrier may thereafter be displaced by means of the drive chain 11 which is connected with portion 21 of the driving carriage, said portion in turn connected with a runner wheel 25 running in a guide means.

The embodiments as illustrated and described are to be regarded as examples only and the various devices of the goods vehicle designed for the engagement and disengagement between the transport containers 13, 14 and the driving carriages 12 may be constructively altered in a variety of ways within the scope of the appended claims. The design of the load-carriers proper is also independent of the inventive idea. The invention also embraces goods vehicles of the kind wherein the support beam 8 is fixed, i.e. not displaceable in its longitudinal direction. The runner 26 may be replaced by a drag means. Instead of having two coupling members 22, each driving arm 20 may be provided with three or several such members, thus making it possible to convey more than two rows of load-carriers on either side of the support beam 8. The roller 25 may be replaced by a sliding means.

Other types of load-carriers than transport container may be conveyed in the goods vehicle, such as a loading pallets supported on runners, drag or chain conveyor means.

The invention is also applicable to stationary installations, such as in storage rooms where there is a need to have access within a limited space to material or goods supported on load-carrier means and where it is thus desired to be able to withdraw one or several such load-carriers from a storage room or to place such load-carriers in the storage room.

One or several of the arms 20 may be provided with one coupling member 22 only in which case only one (large) load-carrier may be conveyed by each such arm.

The guide fingers described in connection with FIGS. 12 to 16 need not be arranged to engage in the wheel bow above each wheel but instead be arranged to exert a pressure against either the inner face of the wheel bows of the two wheels of the wheel pair 15 or against the outer face of said bows during the interconnection.

What I claim is:

1. An arrangement particularly in goods vehicles provided with a loading platform of the kind comprising a continuous conveyor means, two pulleys, one positioned at the rear end of said platform and the other one at the front end of said platform, said continuous conveyor means running over said two pulleys, equidistantly spaced driving carriages provided on said conveyor means, at least two load-carrier means in the form of a transport container arranged to be coupled to each one of said driving carriages, the arrangement comprising an outwardly projecting driving arm on each one of said driving carriages, members mounted on said arm at various distances from the respective carriage, each one of said members arranged to connect a load carrier to an associated driving carriage, guide rails provided on the lower face of each one of said load-carrier means in a position so as to diverge towards one end of said load-carrier means, the arrangement comprising guide means matching said rails, said guide means provided on said driving arms, a blocking means arranged on said driving arm at each one of said guide means, and a catch shoulder formed on each load-carrier means, said guide means arranged to cooperate with said catch shoulders, and wherein said blocking means on said driving arms is a two-arm lever one arm of which, the blocking arm, is arranged to cooperate with said catch shoulder formed on said load-carrier means, the arrangement comprising a piston slidably arranged in a cylinder at the rear end of said loading platform, said piston arranged when displaced upwards, to abut against the opposite arm of the respective one of said levers in order to pivot said blocking arm against the action of a spring means out of engagement with said catch shoulder formed on that one of said load-carrier means which at that moment is positioned immediately above.

2. An arrangement particularly for a goods vehicle having a horizontal loading platform, comprising a horizontal endless conveyor element above the loading platform near the transverse center thereof and extending longitudinally of the loading platform for a major portion of its length, a plurality of equidistantly spaced L-shaped driving carriages adjacent the endless conveyor element for movement therewith over the loading platform, said L-shaped driving carriages lying in a common horizontal plane above and parallel to the loading platform, said L-shaped driving carriages having interior arms arranged longitudinally of the conveyor element and coupled therewith and also having right angular arms extending laterally outwardly of the conveyor element in parallel relationship, a pair of laterally spaced coupling means on each right angular laterally extending arm of each L-shaped driving carriage, and pairs of load carriers arranged in side-by-side relation between said right angular laterally extending arms of the L-shaped driving carriages, said load carriers in each pair having a coacting coupling means engageable with the laterally spaced coupling means of said right angular laterally extending arms, whereby each L-shaped driving carriage can propel one side-by-side pair of load carriers in an endless path on said loading platform, said L-shaped driving carriages at all times remaining in said horizontal plane parallel to the plane of the loading platform while travelling with the endless conveyor element, and mating interfitting tapered guidance means on the bottom of each load carrier and on each right angular laterally extending arm for guiding the coupling means of such arm into coupling engagement with the coacting coupling means of one of said load carriers.

3. An arrangement particularly for a goods vehicle according to claim 2, and means on one end portion of the loading platform adapted to engage said coupling means to release the same whereby load carriers may be separated from the L-shaped driving carriages near one end of said loading platform.

4. An arrangement particularly for a goods vehicle according to claim 2, and supporting wheel means on said right angular laterally extending arms of the driving carriages and on the bottoms of the load carriers and rollingly engaging said horizontal loading platform during movement of said endless conveyor element.

* * * * *